United States Patent [19]

Doyama et al.

[11] Patent Number: 4,791,507

[45] Date of Patent: Dec. 13, 1988

[54] APPARATUS FOR REPRODUCING INFORMATION AT VARIABLE SPEEDS FROM A MAGNETIC TAPE

[75] Inventors: Yoshiaki Doyama, Moriguchi; Kanji Kubo, Hirakata; Koichi Yamada, Neyagawa, all of Japan

[73] Assignee: Matsushita Electric Industrial Co., Ltd., Kadoma, Japan

[21] Appl. No.: 817,860

[22] PCT Filed: May 9, 1985

[86] PCT No.: PCT/JP85/00259

§ 371 Date: Dec. 30, 1985

§ 102(e) Date: Dec. 30, 1985

[87] PCT Pub. No.: WO85/05522

PCT Pub. Date: Dec. 5, 1985

[30] Foreign Application Priority Data

May 11, 1984 [JP] Japan .................................. 59-95001
Jul. 17, 1984 [JP] Japan .................................. 59-147801
Sep. 20, 1984 [JP] Japan .................................. 59-197106

[51] Int. Cl.⁴ ...................... G11B 5/584; G11B 5/592; H04N 5/783
[52] U.S. Cl. ............................... 360/77.15; 360/10.2; 360/73.08
[58] Field of Search .......................... 360/9.1–11.1, 360/70, 73, 75, 77, 21; 358/DIG 1, 342

[56] References Cited

U.S. PATENT DOCUMENTS

| 4,287,538 | 9/1981 | Sakamoto et al. | 360/10.2 |
| 4,521,815 | 6/1985 | Tokuyama | 360/10.2 |
| 4,558,382 | 12/1985 | Edakubo et al. | 360/77 |
| 4,566,045 | 1/1986 | Weissensteiner | 360/77 |
| 4,568,986 | 2/1986 | Furuhata et al. | 360/10.2 |
| 4,581,658 | 4/1986 | Azuma et al. | 360/10.2 |
| 4,581,659 | 4/1986 | Azuma et al. | 360/10.2 |
| 4,594,615 | 6/1986 | Nemoto et al. | 360/10.2 |
| 4,644,413 | 2/1987 | Takayama | 360/10.2 |

FOREIGN PATENT DOCUMENTS 0094194 11/1983 European Pat. Off. ............. 360/75

Primary Examiner—Alan Faber
Assistant Examiner—Steven R. Garland
Attorney, Agent, or Firm—Spencer & Frank

[57] ABSTRACT

A magnetic recording-playback apparatus having a rotary magnetic head mounted on a piezo-electric element so that the head can trace a recording track. The scanning track, voltage waveform applied to a piezo-electric element and tape speed for the next head scanning operation are calculated based on the current application voltage center value and current tape speed, and this arithmetic operation is repeated for each head scan, thereby enabling continuous noise-free picture reproduction at arbitrary tape speeds. Moreover, when the tape speed is changed, the speed command is varied in steps up to the target speed, thereby enabling noise-free picture reproduction also in the transition of tape speeds.

16 Claims, 13 Drawing Sheets

APPARATUS FOR REPRODUCING INFORMATION AT VARIABLE SPEEDS FROM A MAGNETIC TAPE

BACKGROUND OF THE INVENTION

The present invention relates to tracking control for a magnetic recording/playback apparatus (which will be termed simply "VTR" hereinafter) and, particularly, to a method of tracking control for realizing variable-speed playback at arbitrary playback tape speeds in a VTR using four kinds of tracking control pilot signals and an electromechanical transducer for moving the head.

A method of noise-free variable-speed playback using an electromechanical transducer such as a piezoelectric element has been realized in VTRs of the VHS system. In this method, the capstan FG (frequency generator) signal, which virtually represents the tape speed is counted to produce a sawtooth wave. The difference between this sawtooth wave and the sawtooth wave necessary for still picture reproduction is used to produce an actual preset voltage waveform to be supplied to the electromechanical transducer. The capstan FG signal does not indicate the exact tape speed due to slippage of the tape between the capstan and pinch roller, and therefore the preset voltage waveform is corrected by being reset by a playback control signal.

Although the above-mentioned method is effective for VTRs having the control signal, it cannot be applied directly to VTRs using tracking control pilot signals (which will be termed simply "pilot signals" hereinafter) instead of the control signal. The reason is that there is no control signal to be reset and that pilot signals, when four kind of signals are used, recorded on the scanning track need to be identified, as will be described in detail later, which necessitates the introduction of a new method.

Next, the four-frequency pilot system will be summarized, and a conceivable variable-speed playback system and its problems will be described.

FIG. 1 shows magnetic recording traces of the pilot signals. In the figure, $A_1$, $B_1$, $A_2$, and so on are magnetized traces produced by head A and head B, and each recording track has a record of a video signal of one-field length. The pilot signals indicated by $f_1$ through $f_4$ are recorded over the video signal and arranged orderly for each field. The pilot signals have frequencies as listed in Table 1, in which $f_H$ denotes the frequency of the horizontal sync signal.

TABLE 1

| | |
|---|---|
| $f_1 = 102.5$ (kHz) $\approx 6.5 f_H$ | |
| $f_2 = 118.9$ (kHz) $\approx 7.5 f_H$ | |
| $f_3 = 165.2$ (kHz) $\approx 10.5 f_H$ | |
| $f_4 = 148.7$ (kHz) $\approx 9.5 f_H$ | |

Pilot signals of adjacent tracks have a difference of frequencies of $f_H$ or $3f_H$ as shown in FIG. 1. Accordingly, by extracting each frequency difference and comparing the levels, a tracking error signal related to the tracking deviation can be obtained.

FIG. 2 is a block diagram of a circuit for producing the tracking error signal. In the figure, a terminal 1 receives the reproduced RF signal, and a lowpass filter 2 extracts only pilot signals. A balanced modulation (BM) circuit 3 produces the difference of frequencies of the pilot signal received and a reference signal received at terminal 4. For example, the pilot signal reproduced when the head scans the track $A_2$ in FIG. 1 includes $f_3$ which is reproduced on the main scanning track and a composite signal of $f_2$ and $f_4$ which is reproduced as a crosstalk signal. The reference signal at this time is the pilot signal $f_3$ recorded on the main scanning track. The BM circuit 3 at this time provides outputs having frequency differences between $f_3$ and each of $f_2$, $f_3$ and $f_4$, and they include signals of $f_H$ and $3f_H$. These differential frequency signals are picked up by a tuning circuit 5 which extracts $f_H$ and a tuning circuit 6 which extracts $3f_H$, and fed through detecting circuits 7 and 8, respectively, to a comparison circuit 9, which is followed by an analog inverting circuit 10 and an electronic analog switch 11. The switch 11 operates in response to the head switching signal received at a terminal 12, and the output of the comparison circuit 9 and its inverted version are outputted at a terminal 13 alternately for every field. The reason for the need of signal inversion is that the extracted tracking signal has opposite polarities for head A and head B. Namely, a deviation of head A to the right causes an increase in the $f_H$ component, while that of head B causes a decrease in the $f_H$ component. In consequence, a tracking error signal whose polarity is independent of the playback heads can be obtained at the terminal 13.

In order for the tracking control system based on the foregoing principle to accomplish variable-speed playback without producing noise on the screen, the following requirements must be fulfilled.

(1) The scanning start point of the head must be located virtually at the center of the intended track.

(2) The angle of the head scanning trace must coincide with the angle of the recording track.

(3) The pilot signal recorded on the main scanning track must be selected for use as the reference signal supplied to the BM circuit.

Of the three requirements, items (1) and (2) are also applied to the conventional control system using the control signal, while item (3) is applied only to methods using four kinds of pilot signals.

In the normal-speed playback operation in which the tape speed is the same as recording, the reference signal supplied to the BM circuit is switched for each field in the order of $f_1 \rightarrow f_2 \rightarrow f_3 \rightarrow f_4 \rightarrow f_1$. The reason is that the pilot signal reproduced on the recording track also has the order of $f_1 \rightarrow f_2 \rightarrow f_3 \rightarrow f_4$, and even if it is not coincident with the reference signal initially, the resultant tracking error signal acts to control the phase of tape control so that tracking control will settle at the time point when both signals coincide with each other.

When a record is played at a tape speed different from the recording tape speed, the order of switching the reference signal varies depending on the playback tape speed. For example, in the double-speed playback mode, the reference signal is switched in the order of $f_1 \rightarrow f_3 \rightarrow f_1 \rightarrow f_3$, while in the triple-speed playback mode, the order is $f_1 \rightarrow f_4 \rightarrow f_3 \rightarrow f_2 \rightarrow f_1$.

When the variable-speed playback mode includes a smaller number of tape speeds, e.g., only forward triple-speed playback, the system may be designed such that the order of reference signal switching in that mode is preset in the memory circuit and the reference signal is produced in accordance with the command retrieved from the memory circuit. This method may be effective for the case of a fast playback mode having a limited number of tape speeds, however, it is not convenient for the case of many playback speeds because of a great capacity needed for the memory circuit for storing the order of reference signal switching in correspondence to all tape speeds.

Another problem is that when one playback speed is changed to another speed, the tape feed might not follow a changed reference signal satisfactorily. If the new playback tape speed is greatly different from the current tape speed, the tape feed cannot follow the command for a significant time length, resulting in the creation of noise in the reproduced picture. This drawback may be avoided by sensing the tape speed at every moment and generating the piezo-electric element application voltage accordingly; however it needs complex processing. Alternatively, the tape feed response performance is examined in advance and the piezo-electric element application voltage is generated to suit the performance. However, this method also needs complex processing and the tape feed response may possibly change due to a change in the load on the tape feed mechanism caused by an environmental change, aging of the mechanism, or the like.

For a playback system operable for continuous variable-speed playback, a d.c. component included in the voltages applied to the piezo-electric element and voice coil often adversely affects the life and performance of the devices and reduces the power efficiency of the whole system including the driving stage. Therefore, application of a d.c. component to the system component devices must be avoided throughly.

SUMMARY OF THE INVENTION

The present invention is intended to provide a method for accomplishing continuous variable-speed playback operation for a VTR which implements tracking control by processing the signals obtained through the playback head. The inventive method involves operating parameters including the recording tape speed $TS_t$, the voltage $V_t$ for causing the electromechanical transducer to deviate by one track pitch ($T_p$), and the amount of slope $SL_t$ of the preset voltage waveform applied to the electromechanical transducer having an amplitude in correspondence to one $T_p$, and uses the current values of the tape speed $TS_n$, the preset voltage waveform center value $V_n$, and the kind of reference signal $RE_n$ to evaluate the corresponding values $V_{n+1}$ and $RE_{n+1}$ and the amount of slope $SL_{n+1}$ of a preset voltage waveform all necessary for the subsequent head scanning operation. These variables have the following relationship.

$$\frac{V_{n+1}}{V_t} = \frac{V_n}{V_t} + \frac{TS_n}{TS_t} - K \quad (1)$$

$$\left(\text{where } \left|\frac{V_{n+1}}{V_t}\right| \leq \frac{1}{2} \text{ and } K \text{ is an arbitrary integer.}\right)$$

$$\frac{SL_{n+1}}{SL_t} = \frac{TS_n}{TS_t} - 1 \quad (2)$$

$RE_{n+1} = RE_n + K - 4m$ (where $1 \leq RE_{n+1} \leq 4$ and $m$ (3)

is an arbitrary integer.)

In the above expressions, variables are expressed in the form of division of common dimensions so that they are normalized in units of track pitch. For example, a $V_n/V_t$ equal to one signifies the voltage necessary for head deviation by a length of one $T_p$, with a positive polarity indicating the same tape feed direction as recording, while a $V_n/V_t$ equal to $-1$ signifies the voltage for head deviation by one $T_p$ in the direction opposite to the recording tape feed direction. Expression (1) includes a constant K, which is an arbitrary integer determined so that the right term of (1) satisfies the equation. The tape speed is also treated in terms of $T_p$, taking $TS_n/TS_t=1$ for the normal-speed playback, $TS_n/TS_t=2$ for the double-speed playback, and $TS_n/TS_t=-1$ for the reverse standard-speed playback. The voltage slope is also treated identically, taking $SL_{n+1}/SL_t=1$ (double-speed playback) for an amount of slope of one $T_p$, or $SL_{n+1}/SL_t=-1$ (still picture reproduction) for an amount of opposite slope of one $T_p$. The reference signal $RE_n$, when $RE_n=i$, corresponds to a pilot signal of $f_i$, where i is an integer ranging 1 through 4. The constant K used in expression (3) is given the value determined for expression (1), and another constant m is an arbitrary integer which is determined so that the right term of (3) satisfies the equation.

DESCRIPTION OF THE PREFERRED EMBODIMENTS

Figure 3:
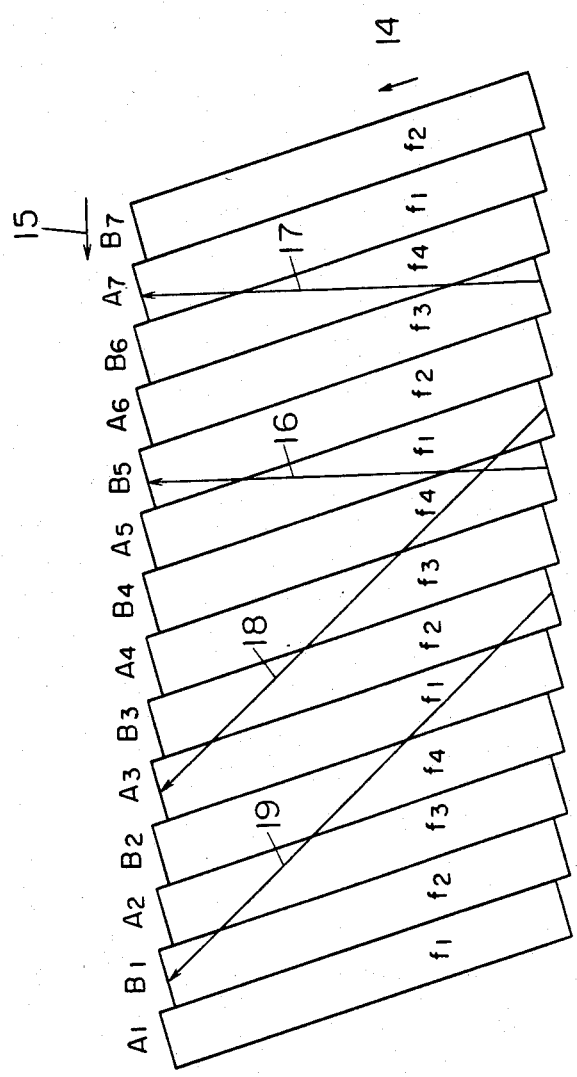
FIG. 3 is a diagram showing the head scanning traces in the forward and reverse triple-speed playback modes.

FIG. 3 shows magnetic traces of pilot signals $f_1$, $f_2$, $f_3$ and $f_4$ recorded on the magnetic tape. The head scans the tape in the direction shown by the arrow 14, while the tape is fed in the direction shown by the arrow 15. Traces $A_1$, $B_1$, $A_2$, $B_2$, and so on are recorded by head A and head B. Lines 16 and 17 indicate the head scanning traces produced when the tape is fed at a speed three times the recording tape speed in the triple-speed playback mode. Lines 18 and 19 indicate the head scanning traces in the reverse triple-speed playback mode. In both the forward and reverse playback modes, the head scans the recording tracks in ascending order of the reference number.

For the accomplishment of noise-free variable-speed playback, it is necesssary for the head to scan one of the tracks, and for this purpose the head needs to deviate in the traversing direction of the recording track. It is a general convention to achieve the head deviation by mounting it on an electromechanical transducer such as a piezo-electric element.

Figure 4:
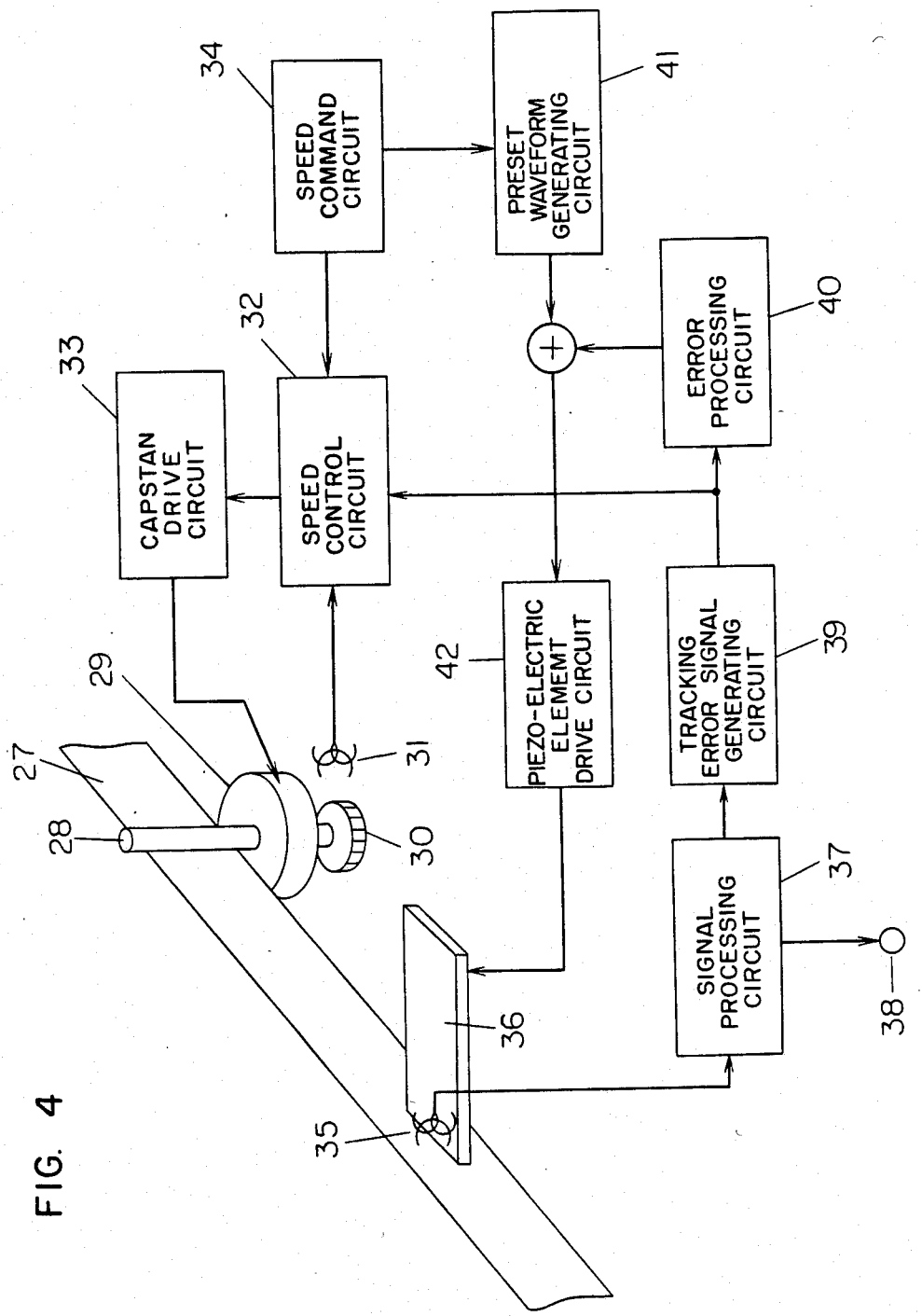
FIG. 4 is a block diagram showing in brief the system arrangement for implementing noise-free variable-speed playback.

FIG. 4 is a block diagram for implementing the noise-free special playback operation without using any control signal. In the figure, a magnetic tape 27 is transported by means of a capstan 28 and a pinch roller (not shown). Reference number 29 denotes a capstan motor, and 30 and 31 in combination constitute a frequency generator (FG) for measuring the number of rotations of the capstan 28. The capstan motor 29 is driven by a drive circuit 33 under control of a speed control circuit 32 so that the output frequency of the FG is always constant. The capstan motor 29 runs at an rpm in compliance with the speed command signal issued by a speed command circuit 34. Reference number 35 denotes a magnetic head placed on a piezo-electric element 36, and both members are rotated by being mounted on a rotary cylinder (not shown). Various signals reproduced through the magnetic head 35 are delivered to a signal processing circuit 37, and the reproduced video signal is outputted through its terminal 38. The pilot signal recorded over the video signal is extracted by the signal processing circuit 37 and supplied to a tracking error evaluation circuit 39. The circuit 39 produces a tracking error signal proportional to the difference of the crosstalk signals reproduced on the tracks adjacent the main scanning track. The operation of the circuit 39 is the same as described previously in connection with FIG. 2.

The tracking error signal is supplied to the capstan speed control circuit 32 and used to control the phase of tape feed. A preset waveform generating circuit 41 produces a preset waveform in response to the speed command signal, and in practice signals can be processed by use of a microprocessor and its associated devices. A tracking error processing circuit 40 receives the tracking error signal from the circuit 39 and extracts a tracking error signal only for the amount of a track curve, for example. The output of the tracking error processing circuit 40 and the preset waveform provided by the circuit 41 are merged, and the resultant signal operates on the drive circuit 42 to drive the piezo-electric element 36.

Figure 5:
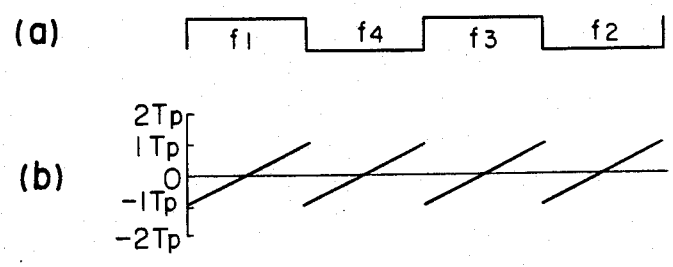
FIG. 5, parts (a) and (b), are waveform diagrams showing the preset voltage and reference signal in the forward triple-speed playback mode.

FIG. 5 shows the preset voltage waveform supplied to the electromechanical transducer in the forward triple-speed playback mode. The waveform shown in (a) is the head switching signal, which carries reference signals $f_1$, $f_4$, $f_3$ and $f_2$ used for the respective fields. The sawtooth wave shown in (b) is the voltage waveform applied to the electromechanical transducer, and the voltage is plotted vertically in terms of the track pitch ($T_p$) with the polarity being positive for the tape feed direction shown by 15 in FIG. 3 and negative for the opposite tape feed direction. With the voltage of FIG. 5(b) supplied to the electromechanical transducer, the head scans track $A_5$ in FIG. 3 for the first field and it scans track $B_6$ for the next field.

Figure 6:
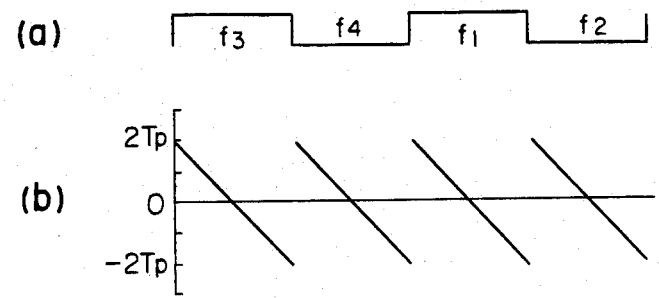
FIG. 6, parts (a) and (b), are waveform diagrams showing the preset voltage and reference signal in the reverse triple-speed playback mode.

FIG. 6 shows the reference signals used in the reverse triple-speed playback mode and the voltage waveform applied to the electromechanical transducer.

Figure 1:
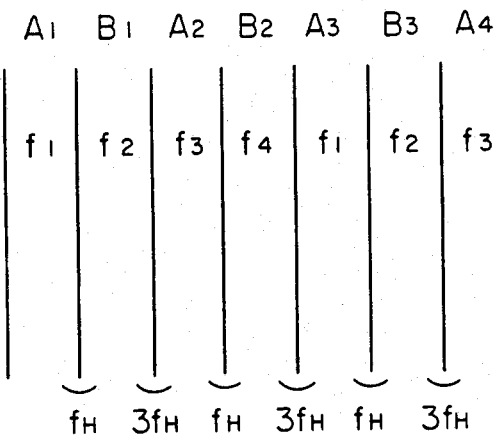
FIG. 1 is a diagram showing the magnetic recording trace of the record of the pilot signals.
Figure 2:
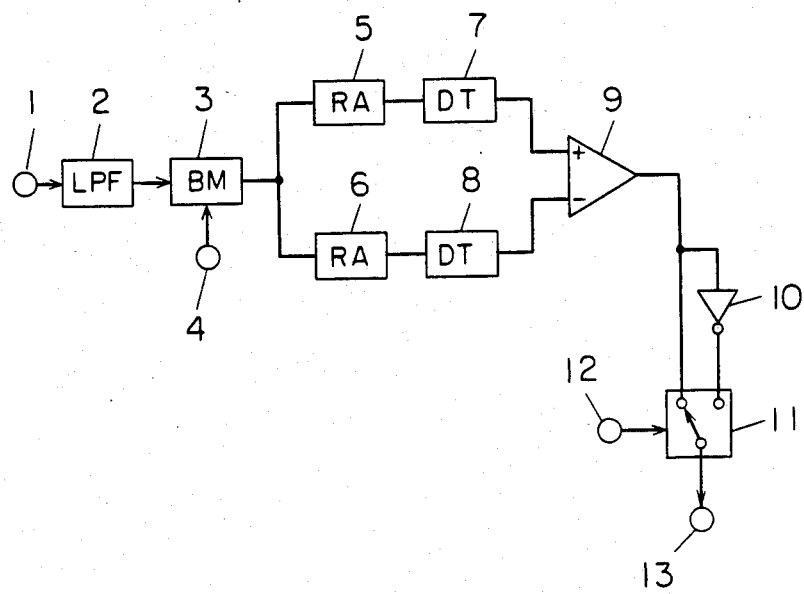
FIG. 2 is a block diagram showing the reproduction circuit for obtaining the tracking error signal.
Figure 7:
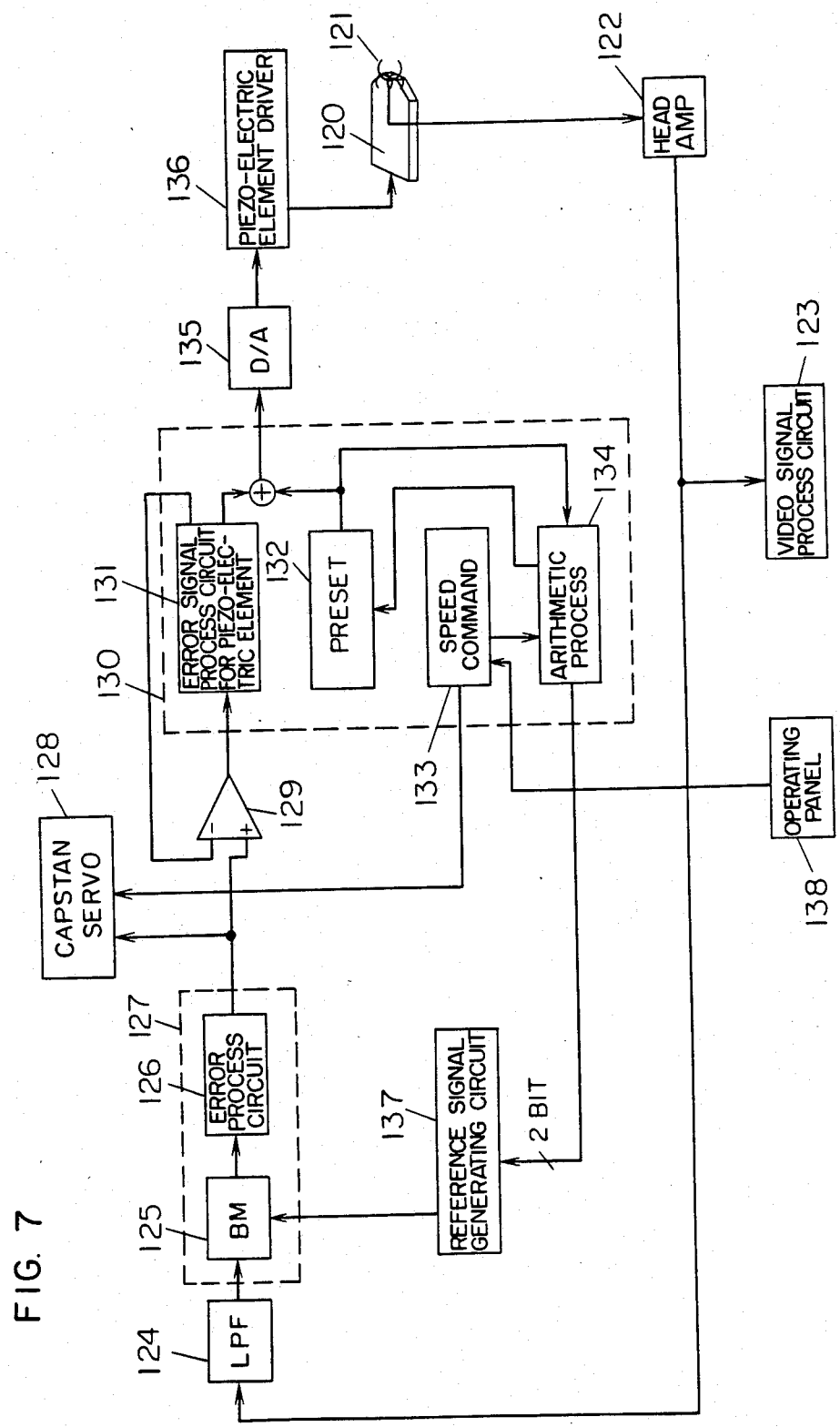
FIG. 7 is a block diagram showing an embodiment of this invention.

FIG. 7 shows in more detail the processing circuit for the piezo-electric element shown in FIG. 4. The tracking error signal produced by the circuit section 127 enclosed in the dashed block, which has been described in connection with FIG. 2, is received by a comparison circuit 129 and compared with the error signal of the previous frame received at the negative input terminal of the circuit. The comparison circuit 129 delivers its output to an error signal processing circuit 131 used for the piezo-electric element. Details of the circuits 129 and 131 will be described later. The circuit 131 provides a d.c. component of track deviation and a tracking error signal corresponding to a track curve. A preset waveform generating circuit 132 produces the sawtooth wave as shown in FIG. 5, for example. The preset voltage varies depending on the playback tape speed, and its details will be described later. The tracking error signal and preset signal for the piezo-electric element are added, and processed by a D/A converter 135 and a drive circuit 136 for the electromechanical transducer, and then applied to the electromechanical transducer 120 so that the head 121 scans the main scanning track for the picture reproduction.

Figure 8:
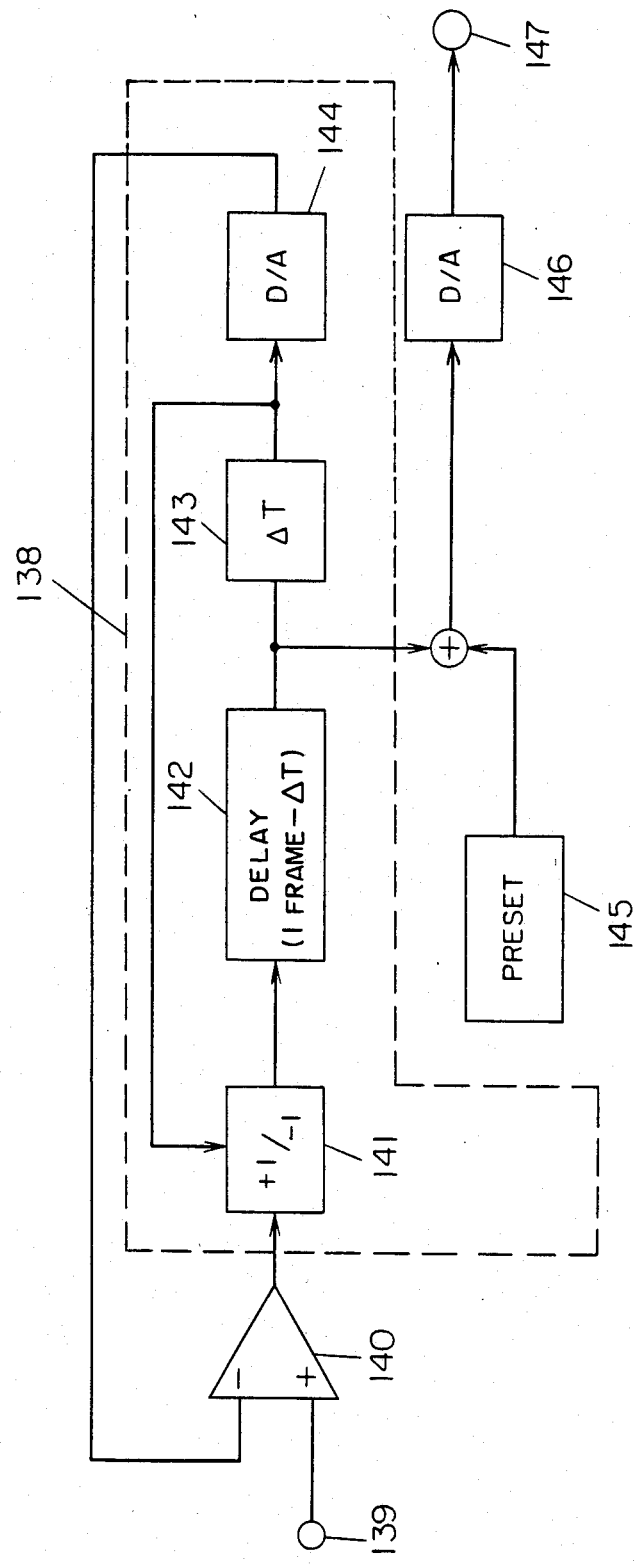
FIG. 8 is a block diagram showing in more detail the error signal processing circuit for the piezo-electric element used in this embodiment.

Next, a particular arrangement of the circuit 131 will be described. FIG. 8 shows a block diagram related to the circuit 131, where the circuit section 138 enclosed by the dashed line corresponds to the circuit 131. Circuit 140 is a level comparison circuit which is identical to the comparison circuit 129 shown in FIG. 7. The tracking error signal received at a terminal 139 is compared level with a signal produced by D/A converter 144 and related to the tracking error signal of the preceding frame. A circuit 141 performs fine modification for the tracking error signal of the preceding frame by addition of one or subtraction of one depending on the output of the circuit 140. The modified error signal is delayed by delay circuits 142 and 143 by a 1-frame time length, and it is fed back to the fine modification circuit 141. The circuit 143 is a delay circuit used to compensate for the delay of the control circuit after the signal with a delay of one frame time length minus ΔT has been outputted from the circuit 142 until it is obtained as a trackling error signal at the terminal 139. The output of the circuit 143 is processed by the D/A converter 144 and supplied to the comparison circuit 140. The output of the circuit 142 is added to the output of the preset waveform generating circuit 145, processed by a D/A converter 146, and outputted through a terminal 147. A particular arrangement of the error signal processing circuit 131 for the piezo-electric element has been described.

Next, the processing for the variable-speed playback mode will be described. The arrangement of FIG. 7 includes a tape speed command circuit 133, which processes a signal entered through a key 138, for example, and produces a tape speed command signal. The command signal is supplied to a capstan control circuit 128 so that the tape feed speed is determined. Signals entered to an arithmetic processing circuit 134 include the tape speed command signal, preset voltage center value and current reference signal stored in the arithmetic processing circuit. The center value signifies the level of the preset voltage waveform at the middle of its slope, and it is zero $T_p$ in FIGS. 5 and 6, for example. Output signals resulting from the processing of these input signals include a value of slope of the preset waveform and a command signal for determining the reference signal necessary for the subsequent scanning operation. The 2-bit command signal operates on the reference signal generating circuit 137 to produce one of $f_1$ through $f_4$.

Next, the processing of the arithmetic processing circuit 134 will be described. In the following discussion, the four kinds of reference signals are generically termed as "reference signal".

Figure 9:
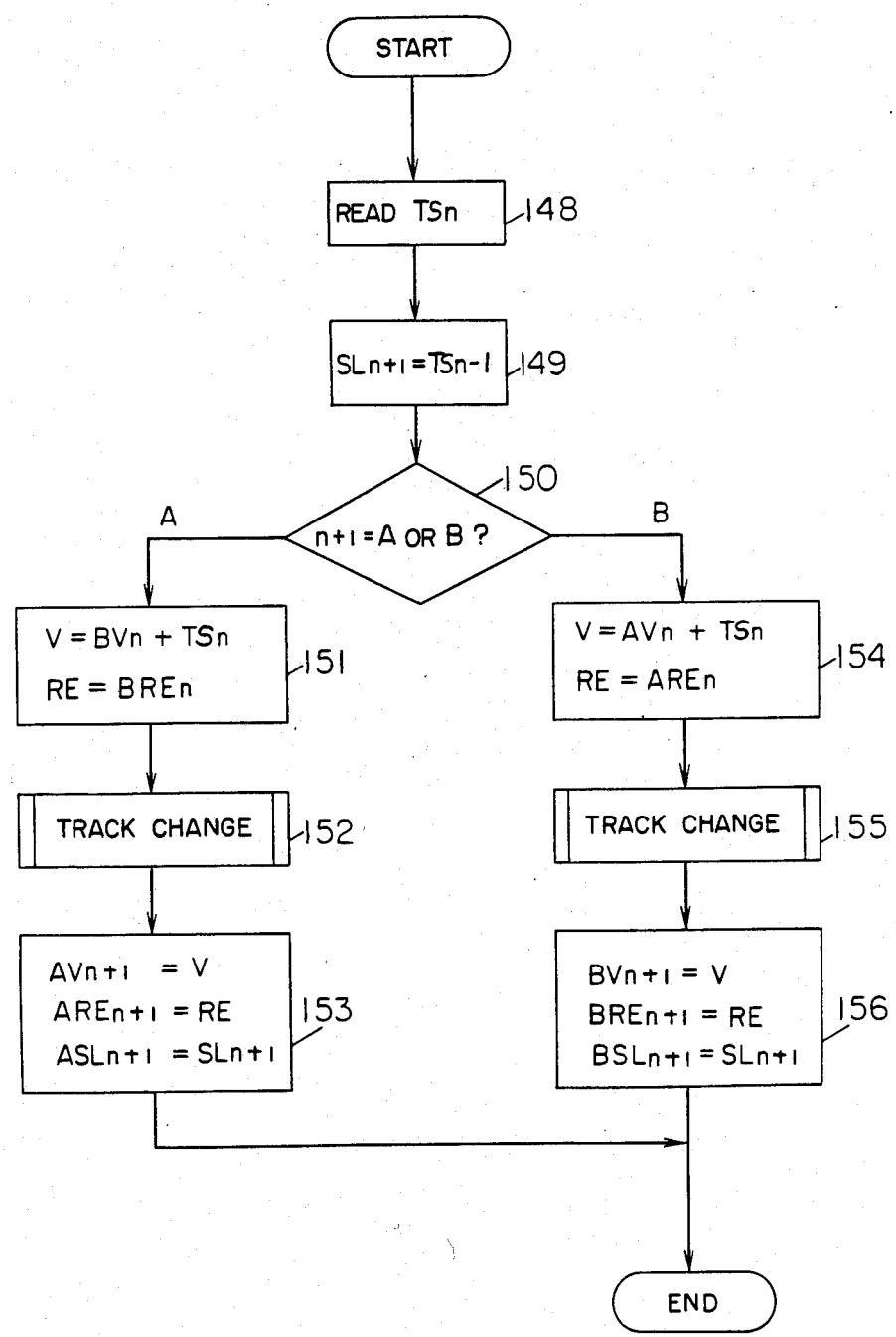
FIG. 9 is a flowchart showing the processing implemented by the arithmetic processing circuit.
Figure 10:
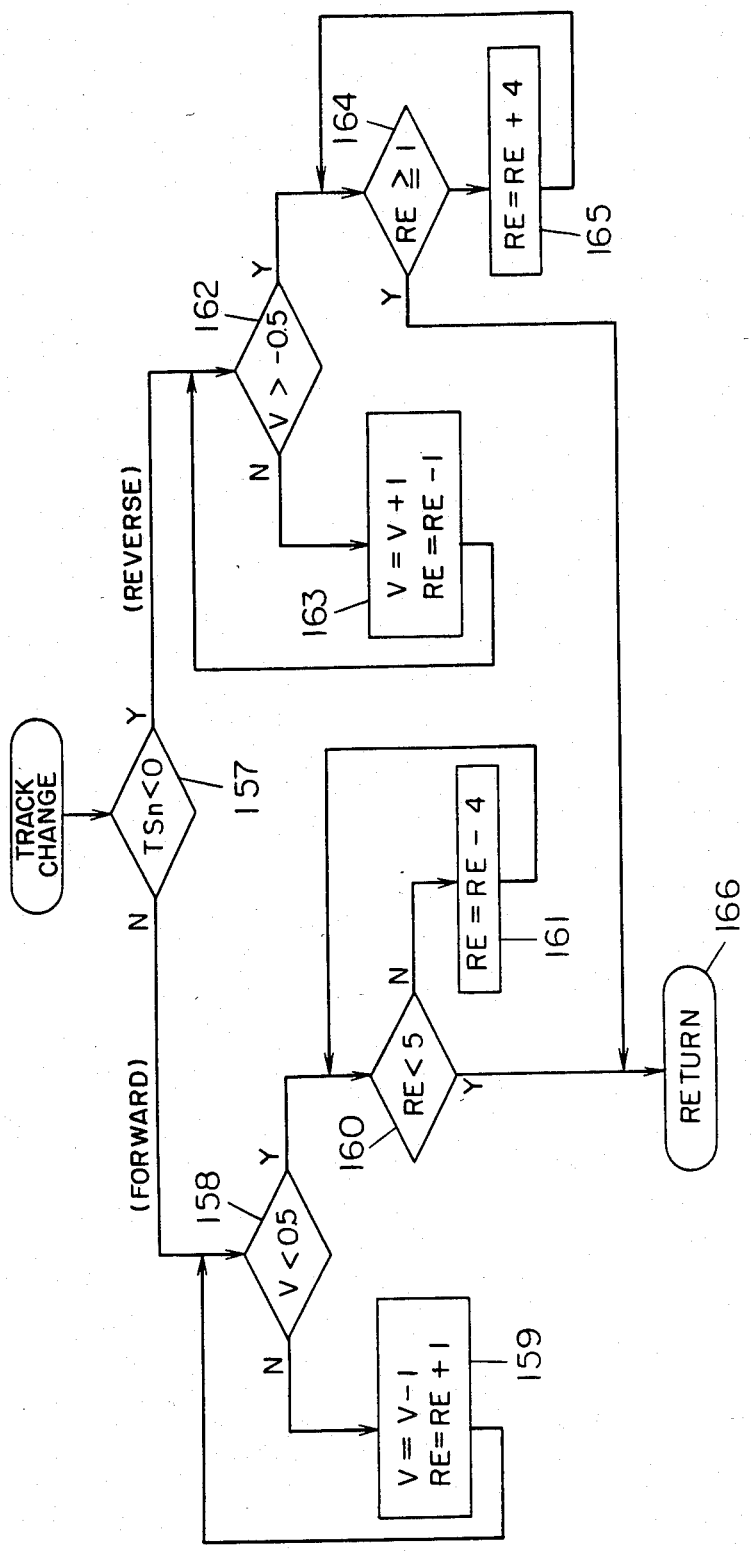
FIG. 10 is a flowchart showing the processing of the subroutine used in FIG. 9.

FIGS. 9 and 10 are flowcharts showing the procedures of processing. FIG. 9 shows the procedure of obtaining the preset waveform for the next (n+1)th field from the known preset waveform for the (n)th field, with the assumption that the track is scanned by head B for the (n)th field. It is also assumed that the center value $BV_n$ of the preset waveform and the reference signal $BRE_n$ are known. Accordingly, the object is to obtain the value of $AV_{n+1}$ and $ARE_{n+1}$ for the next field.

Initially, the current tape speed $TS_n$ is read in the speed command circuit 133, for example, in block 148. Subsequently, the slope $SL_{n+1}$ of the preset waveform is calculated using equation $SL_{n+1}=TS_n-1$ as shown in step 149. These variables are treated in units of track pitch. For example, $TS_n=1$ (one track pitch) in the normal-speed playback mode and therefore slope $SL_{n+1}$ is zero, while $SL_{n+1}$ becomes two in the triple-speed playback mode, and it takes $-4$ for the reverse triple-speed playback mode. The tape speed $TS_n$ is not limited to an integer, but it can take an arbitrary real number. The preset waveform of the next field, i.e., (n+1)th field, has a center voltage $AV_{n+1}$ which is supposed to be the center voltage $BV_n$ of the (n)th field added by the tape speed $TS_n$. Namely, the (n+1)th field will be reproduced by the scanning of head A, and a temporary value $V=BV_n+TS_n$ is obtained through step 151. At the same time, a temporary reference signal $RE=BRE_n$ is also set. If the same reference signal is used repeatedly for several fields, the value of V will increase progressively, and to avoid this the reference signal is varied in step 152 so that the V takes a value within ±0.5 track pitch. This is the reason for the above phrasing "temporary".

From the values V and RE processed as described above, the center value $AV_{n+1}$ and reference signal $ARE_{n+1}$ for the next (n+1)th field are obtained and the slope $ASL_{n+1}$ of the (n+1)th field is obtained from the slope $SL_{n+1}$ in step 153. These are the procedures for obtaining the center value $AV_{n+1}$ and reference signal $ARE_{n+1}$ for the (n+1)th field (scanned by head A) from the center value $BV_n$ and reference signal $BRE_n$ for the (n)th field (scanned by head B). Next, the operation of the case when head A is used for scanning for the (n)th field will be described. In this case, the (n+1)th field is reproduced by the scanning of head B as determined in step 150, and and therefore $AV_n+TS_n$ is entered as the temporary center value V and $ARE_n$ is entered as the temporary reference signal RE in step 154, and the reference signal is changed by the process of step 155 (the same process as step 152) so that V takes a value within ±0.5 track pitch. From the values V and RE processed as described above, the center value $BV_{n+1}$ and reference signal $BRE_{n+1}$ for the next field ((n+1)th field scanned by head B) are obtained. Discrimination of scanning by head A or head B can be based on the value of the head switching signal, or it is also possible to know the scanning head basing on whether the value of n is odd or even. (The correspondence rule for the head discrimination is determined at the beginning.) These are the procedures for obtaining the values (center value, slope and reference signal) for the (n+1)th field from the values for the (n)th field. This procedure is executed for each field.

Next, the "track change" process which takes place in steps 152 and 155 will be described. This subroutine process is shown in more detail in FIG. 10. In the figure, step 157 discriminates the tape feed direction and branches the processing for the forward playback or reverse playback accordingly. Steps 158 and 159 modify the preset center voltage so that it does not exceed 0.5 track pitch. If V is larger than or equal to 0.5, it is reduced by 1 repeatedly until it is below 0.5, with the reference signal being increased by one at each above cycle. Steps 160 and 161 limit the reference signal below five. Since individual reference signals $f_1$ through $f_4$ correspond to values 1 through 4 of RE, the value of RE in excess of 4 is reduced by 4 so that it takes one of 1 through 4. The processing for the reverse playback mode takes place using the same principle, and the values V and RE are modified. These comments explain the arithmetic processing circuit 134 shown in FIG. 7. In FIG. 7, the circuit section enclosed in the dashed block 130 can operate entirely using digital signals, and the signals can be processed using a microprocessor.

Although a 2-head helical scanning VTR has been described as an example, the present invention can also be applied to VTRs using four kinds of pilot signals, e.g., 1-head VTRs and 4-head VTRs with smaller cylinder diameter.

Figure 11A:
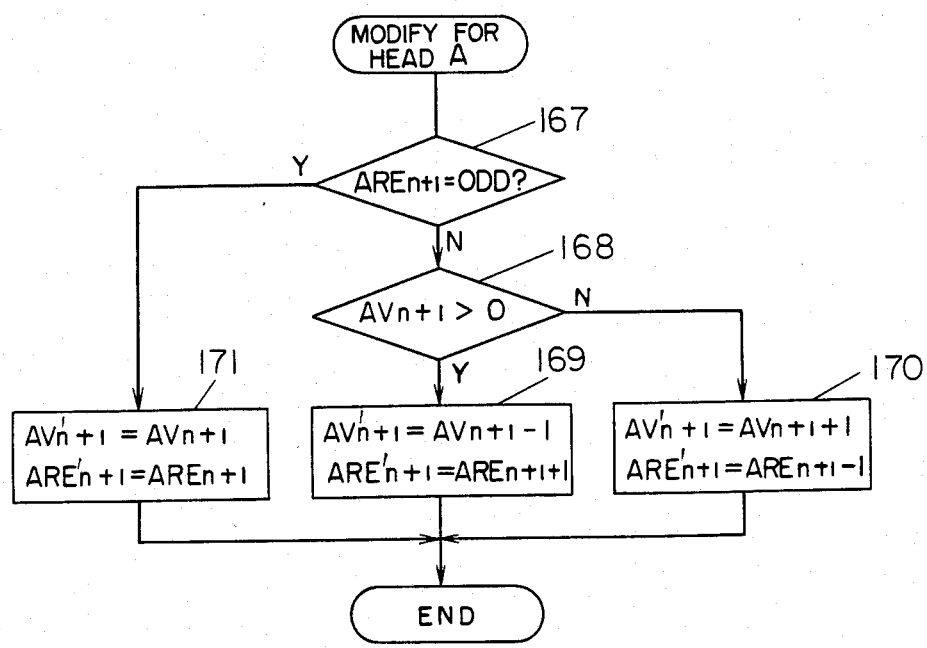
FIGS. 11(a) and 11(b) illustrate a set of flowcharts showing the modification process.

The foregoing procedures for selecting a scanning track during playback operation are inconvenient in a VTR of the type which operates to record at different azimuthes for head A and head B so that crosstalk of luminance signal component from adjacent tracks decreases for the purpose of high density recording. In this case, scanning by head B on the track which has been recorded by head A does not provide a sufficient reproduction output, and vice versa. Therefore, it is necessary for both heads to scan the recording tracks which have been recorded at the same azimuth. Namely, the results of the processings described using FIGS. 9 and 10 need to be modified such that head A scans a track with reference signal $f_1$ or $f_3$, while head B scans a track with reference signal $f_2$ or $f_4$. This processing procedure, shown in the flowchart of FIG. 11, will be described in the following. In FIG. 11(a), step 167 tests as to whether the track scanned by head A has an odd reference signal (1 or 3). If the reference signal is odd, the sequence branches to step 171. If it is even (2 or 4), the sequence proceeds to step 168 to read the center value $AV_{n+1}$ of the application voltage at the scanning of head A, and it is modified by one track pitch so that the absolute value does not exceed one track pitch. (Namely, if $AV_{n+1}$ is positive, it is reduced by one track pitch.) At the same time, the reference signal is also modified by one. These operations are carried out in steps 169 and 170. Using the modified values $AV'_{n+1}$ and $ARE'_{n+1}$, control for the (n+1)th field takes place. It should be noted that for obtaining the values for the next (n+2)th field, the previous values $AV_{n+1}$ and $ARE_{n+1}$ are used instead of $AV'_{n+1}$ and $ARE'_{n+1}$. These are the method of modification for the scanning by head A.

Figure 11B:
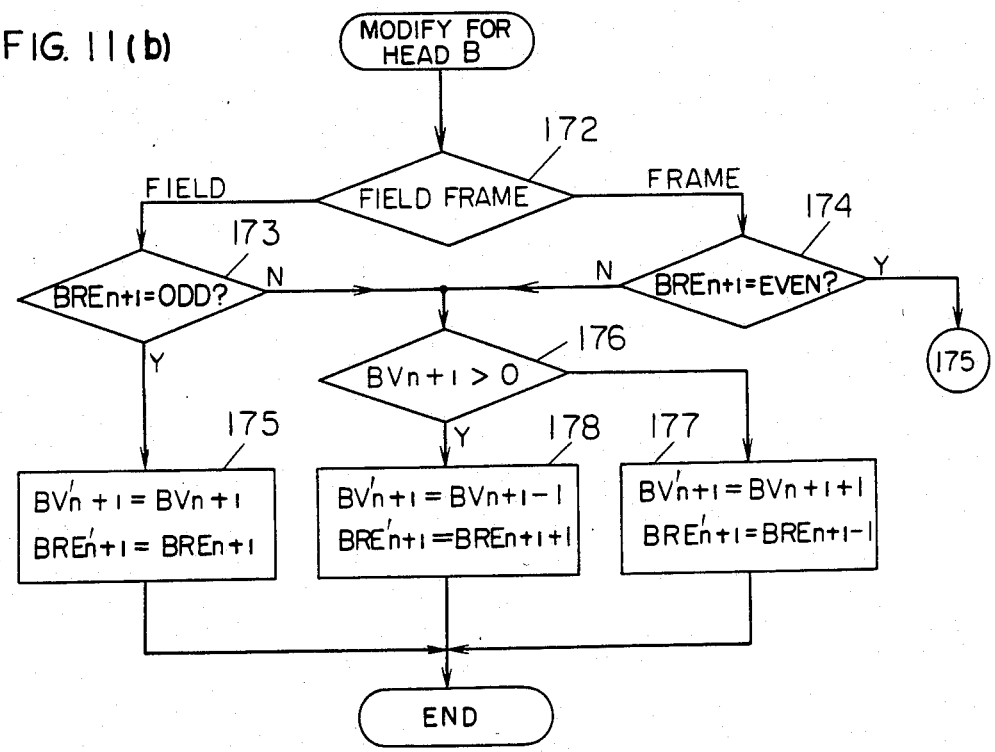

Next, the modification method for the scanning by head B will be described. There are two ways for the arrangement of head B. One is the provision of the same azimuth as head A, and the other is the provision of the same azimuth as recording. The former will be termed "field reproduction" and the latter "frame reproduction". In field reproduction, head B scans a track with an odd reference signal, while in frame reproduction, head B scans a track with an even reference signal. In FIG. 11(b), step 172 selects field reproduction or frame reproduction. For field reproduction, the sequence proceeds to step 173 to test whether the reference signal $BRE_{n+1}$ at the scanning by head B is odd. If it is odd, the values are used without modification in step 175. If it is even, the sequence proceeds to step 176 to modify $BV_{n+1}$ and $BRE_{n+1}$ (steps 177 and 178). These steps represent the case of field reproduction.

For frame reproduction, step 174 tests whether the reference signal $BRE_{n+1}$ is even. Unless the signal is even, the sequence proceeds to step 176 to modify $BV_{n+1}$ and $BV_{n+1}$ and $BRE_{n+1}$. Using the modified values $BV'_{n+1}$ and $BRE'_{n+1}$, the actual tracking control takes place. It should be noted that the values $BV_{n+1}$ and $BRE_{n+1}$ before the modifying operation are used to obtain the values for the next field. These modification processes are executed after the values for the next field have been obtained in FIG. 9.

Next, the processing for changing the current playback tape speed to another playback tape speed will be described. In operation, the tape speed command is increased repeatedly at a constant increment of speed which is slower than the standard tape speed each time the tape speed has settled at an intermediate stage until the target tape speed is finally reached.

Figure 12:
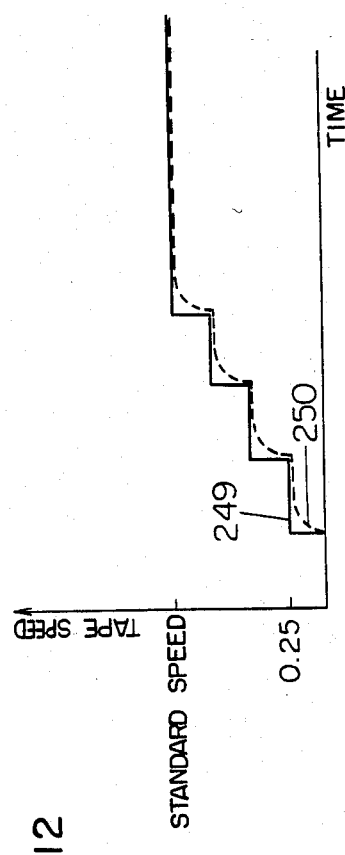
FIG. 12 is a waveform diagram showing the command and response in the case where the tape speed is varied in steps.

FIG. 12 shows the tape speed rise response when the tape speed is changed from the still mode to the standard-speed mode at an increment of ¼ standard-speed. In the figure, the system stays in the still mode until $t_3$, at which time point the command of standard-speed mode is given and the tape speed control circuit receives the first ¼ up-speed command. At constant intervals, the tape speed increases to 2/4, ¾ and to the 4/4 standard tape speed. In FIG. 12, the solid line 249 indicates the ideal tape speed rise performance, and the preset voltage is produced in accordance with the speed command shown by 249. The dashed line 250 indicates the actual tape speed rise response. Although the actual response deviates from the ideal performance in the ¼ speed increment, no noise will appear on the screen. The reason is that the trace of still reproduction is not much different from the scanning trace at the ¼ tape speed, and therefore even with a preset waveform for the ¼ speed in the stationary state of the tape, the decrease in the reproduction output is not large enough to create noise at the transition. This is also true for the transition of tape speed from ¼ speed to 2/4 speed, and for the subsequent transition. In FIG. 12, $t_4$ is the time point of change from ¼ speed to 2/4 speed, and $t_5$ is the time point of change from 2/4 speed to ¾ speed. The duration of each stage, e.g., between $t_3$ and $t_4$, is determined so that the tape speed virtually settles in the time length. According to experiment, a 1-frame time length (1/30 second) suffices for one-step tape speed transition. Accordingly, the transition from the still mode to the standard speed mode takes only 4/30 second by the operation of ¼ speed increments, and no practical problem will arise.

The primary feature of this method is that the control is not much affected by the load variation of tape feed. The reason is that by choosing the duration of the intermediate step so that the tape speed settles even under the expected maximum load condition, the deviation of the actual tape speed rise response from the ideal performance at each step does not create noise on the screen as mentioned previously. The second feature is that the same idea can be applied to the speed change operation from an arbitrary speed mode to another speed mode. For example, when changing from the standard tape speed to triple speed, the tape speed is changed in steps of ¼ standard tape speed, and no noise appears on the screen when the system has entered the double-speed mode.

Although in the above example the process for using ¼ speed increments has been described, it will be appreciated that the value of the step may be ⅛ standard speed, or ½ standard speed as determined depending on each system.

Figure 13:
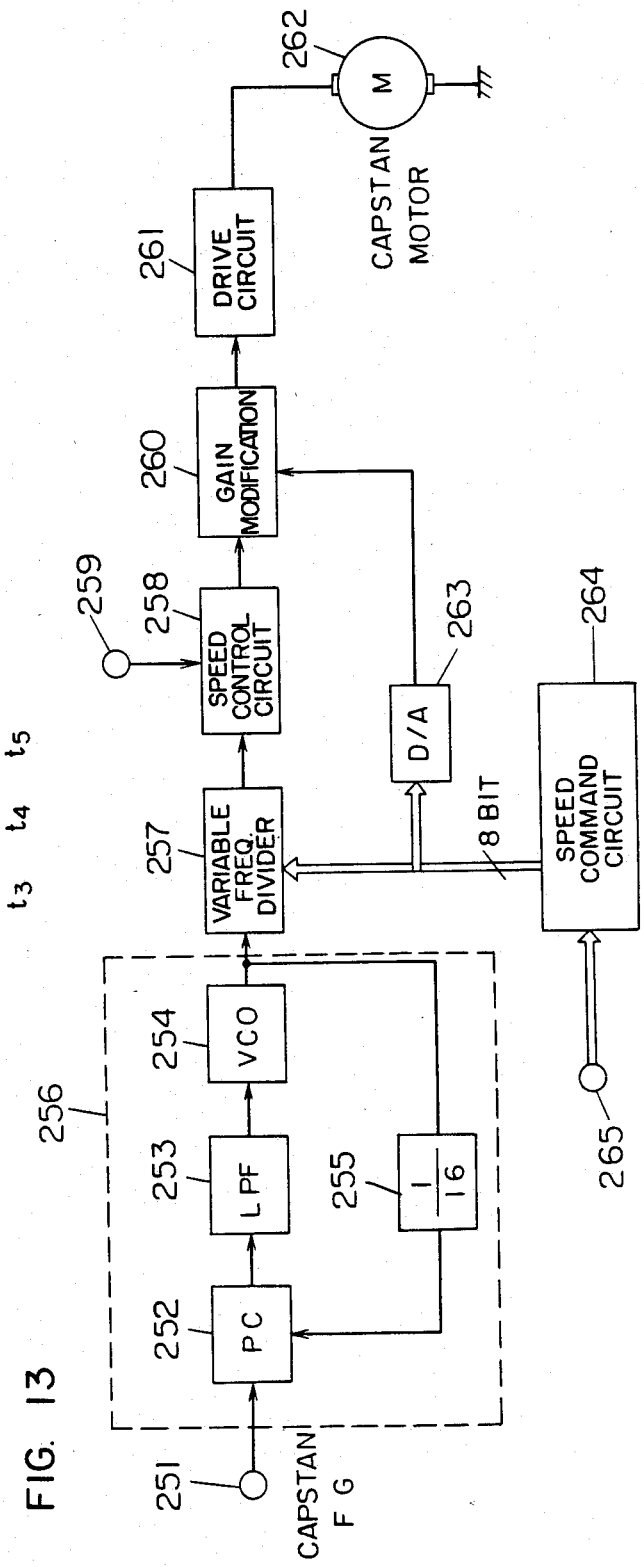
FIG. 13 is a block diagram of the capstan motor speed control circuit.

Next, a particular circuit arrangement for changing the tape speed in constant steps will be described with reference to FIG. 13. In the figure, a terminal 251 receives the capstan FG signal having a frequency which is proportional to the tape feed speed. Circuit 252 is a phase comparison circuit, circuit 253 is a low-pass filter, circuit 254 is a voltage-controlled oscillation circuit, and a circuit 255 is a frequency division circuit which divides the frequency by 1/16 in this embodiment. A circuit group 256 including circuits 252 through 255 constitutes a PLL (Phase Locked Loop) circuit, which in this embodiment operates to multiply the frequency of the capstan FG signal by 16. Circuit 257 is a variable frequency division circuit, which operates at a frequency division rate determined by the tape speed command circuit 264. The speed command circuit 264 receives at terminal 265 the speed command information which is entered through a key and conducted through the system controller. Circuit 258 is a speed control circuit, which produces a speed error signal depending on the frequency of the input signal to the circuit 258. Circuit 260 is a variable gain circuit, which modifies the loop gain of the control system. In a control system such as shown in FIG. 13 where the capstan FG signal frequency varies depending on the rpm of the motor, but the input signal to the speed control circuit 258 is controlled to a constant frequency through the appropriate setting of the frequency division rate of the variable frequency division circuit, the loop gain of the control system is inversely proportion to the capstan rpm. For example, when making reference to the loop gain of the standard speed mode, the loop gain of the half-speed mode is doubled, and that of the n-fold speed mode is reduced to 1/n. On this account, a control system having an arbitrary target rpm needs a loop gain modification circuit. In the control system of this embodiment, the loop gain is inversely proportional to the rpm of the capstan motor as mentioned previously. Therefore, the division command signal for the variable frequency division circuit can be the same as the command signal for gain modification, and this fact is another feature of this invention. Circuit 263 is a D/A conversion circuit, which converts an speed command signal into the analog signal and supplies it to the gain modification circuit. Circuit 261 is a capstan motor drive circuit, which drives the capstan motor 262 to determine the tape speed. The tape speed control circuit shown in FIG. 13 is supplied at its terminal 259 with the tracking error signal used in FIG. 4, and operates to control the rotational speed and rotational phase of the capstan motor in conjunction with other control circuits. Table 2 lists the frequency division rate $D_1$ for the PLL, the frequency division rate $D_2$ for the variable frequency division circuit, and the rotational speed of the capstan motor. With the frequency division rate $D_2$ being set to 16, the divisionn rates of the PLL circuit and the variable frequency division circuit cancel with each other, and the tape speed control circuit will settle by receiving a signal with the same frequency as the capstan FG signal. This is the standard-speed mode. In order for the signal fed to the speed control circuit to have a frequency equal to that of the capstan FG signal in the standard-speed mode, with the variable frequency division circuit having its division rate set to 1, the capstan motor needs to be driven at a speed 1/16 the standard speed. Namely, the speed control at 1/16 standard speed can be done. Other rotational speeds can also be set in the same way, and Table 2 shows the control parameters for the setup speeds ranging 1/16-fold through 7-fold standard speed at an increment of 1/16 speed. Accordingly, the variable speed control for n-fold standard speeds described in connection with FIG. 12 can be implemented using the tape speed control circuit shown in FIG. 13.

TABLE 2

| $D_1$ | $D_2$ | N |
|---|---|---|
| 16 | 1 | $\frac{1}{16}$ |
| 16 | 2 | $\frac{2}{16}$ |
| 16 | 3 | $\frac{3}{16}$ |
| . | . | . |
| . | . | . |
| . | . | . |
| 16 | 16 | $\frac{16}{16}$ |
| 16 | 17 | $1\frac{1}{16}$ |
| 16 | 18 | $1\frac{2}{16}$ |
| . | . | . |
| . | . | . |
| . | . | . |
| 16 | 111 | $6\frac{15}{16}$ |
| 16 | 112 | 7 |

Although in this embodiment an increase in the tape speed to the standard speed has been described, it will be appreciated that the invention can also be applied to a reduction of the tape speed, such as from the standard speed mode to the still mode. In this case, the tape feed speed is reduced in steps.

Moreover, this method allows the computation of the piezo-electric element driving waveform for the current playback tape speed on a software basis, whereby a fine speed setting can easily be achieved in response.

The foregoing method enables the continuous playback operation from an arbitrary playback tape speed to another speed.

The following describes the method of preventing the application of a d.c. component to the piezo-electric element in the foregoing method.

Figure 14:
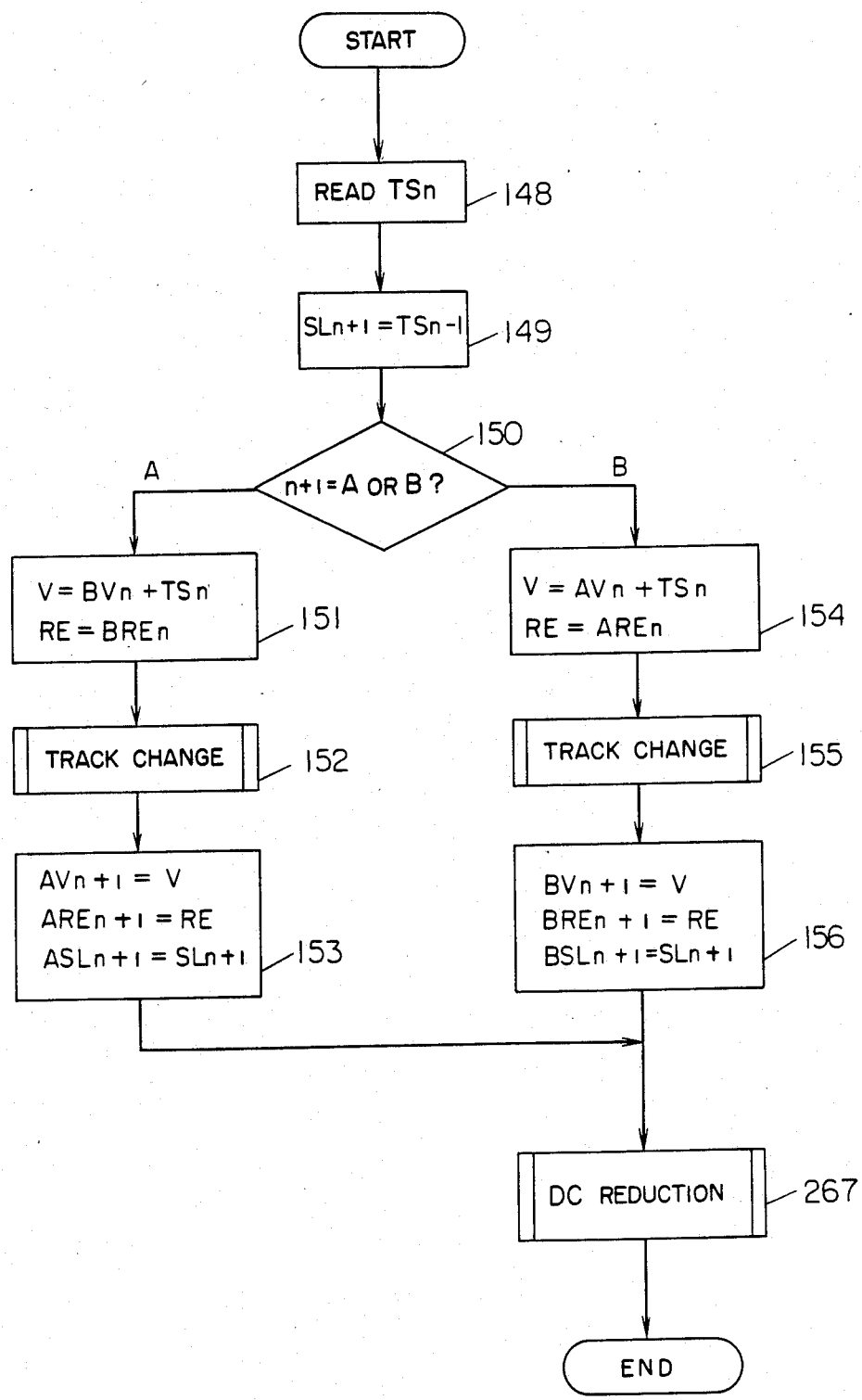
FIG. 14 is a flowchart for the arithmetic processing circuit for implementing additionally the process for reducing a d.c. component.
Figure 17:
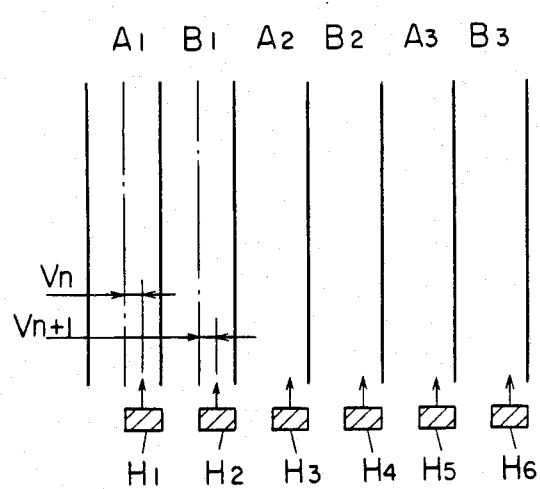
FIG. 17 is a diagram showing a remaining d.c. component.

The $V_{n+1}$ (the center value of the piezo-electric element application voltage, i.e., a d.c. component) which is obtained by the process described above may possibly retain a d.c. component smaller than $\frac{1}{2}$ track pitch. In FIG. 17, heads $H_1$, $H_2$, and so on without voltage application are out of the center of tracks $A_1$, $B_1$, $A_2$, $B_2$, and so on, and there arises a case in which the heads scan the track center by application of voltages $V_n$, $V_{n+1}$, and so on. This case arises when TS=1 and, at the same time, $V_n \neq 0$, for example. On this account, after the application voltage $V_{n+1}$ has been obtained, the process "d.c. reduction" 267 is added as shown in FIG. 14. The processing is shown in FIG. 15.

Figure 15:
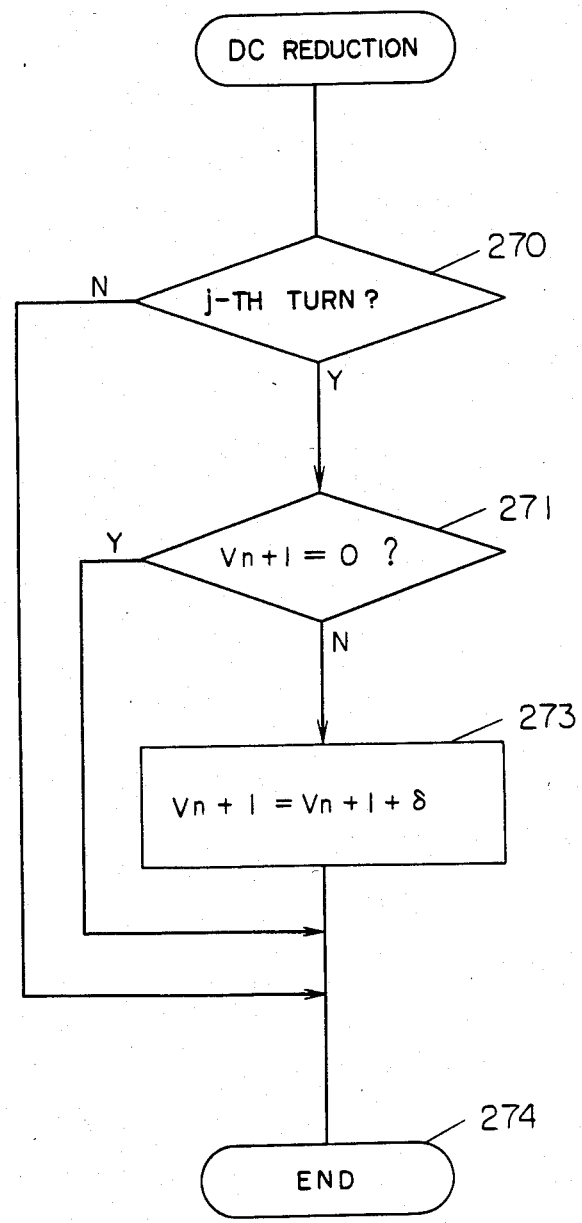
FIG. 15 is a flowchart for a d.c. component reducing process.

In FIG. 15, step 270 tests whether this is the j-th entry to the routine. If it is true, the sequence proceeds to step 271, or if not, the sequence branches to step 274 to terminate the process. The variable j is an integer larger than zero. Subsequently, step 271 tests whether the $AV_{n+1}$ or $BV_{n+1}$ (only $V_{n+1}$ is shown here) obtained through the processes of FIGS. 9 to 11 is zero. If $V_{n+1}$ has a value of zero, the sequence proceeds to step 274 to terminate the process or if not, the sequence proceeds to step 273, in which the $V_{n+1}$ obtained through the processes of FIGS. 9 to 11 is updated by being increased by $\delta$. Then the process is completed.

Figure 16:
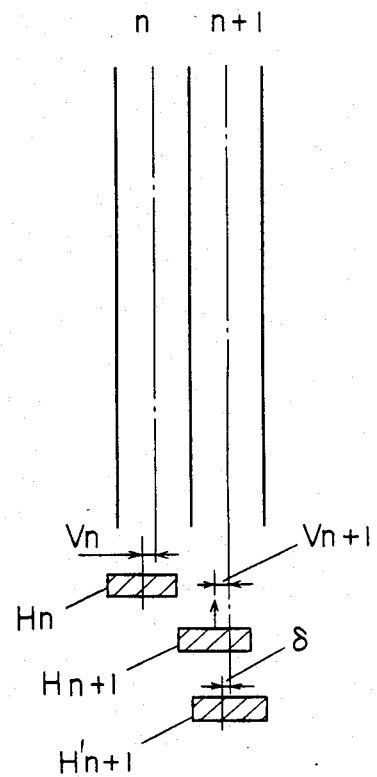
FIG. 16 is a diagram showing a reduction in the d.c. component.

By addition of the process shown in FIG. 15, the value of $V_{n+1}$ becomes zero in a finite time. This process, as a result, performs modulation of tape feed, thereby matching the head position to the phase of the tape feed. Assuming that head $H_n$ scans track n in FIG. 16, the head center deviates from the track center by the value corresponding to $V_n$. On this account, the voltage $V_n$ is applied so that the head is displaced by the amount of $V_n$. The same process takes place for the combination of track n+1 and head $H_{n+1}$. The voltage $V_{n+1}$ corresponds to the displacement of the head $H_{n+1}$. The process of FIG. 15 is the case of head displacement by $V_{n+1}+\delta$ instead of $V_{n+1}$. The head position after the voltage application is displaced by $\delta$ from the track center as shown by $H'_{n+1}$. Accordingly, the tracking error signal obtained at this time is offset by an amount corresponding to $\delta$. The tracking error signal is fed to the capstan control circuit as shown in FIG. 7 for use in tape feed control, and the tape feed speed varies by an amount corresponding to $\delta$, and it is controlled so that the head scanning center finally coincides with the track center. The value of $\delta$ is so small that the signal level does not fall significantly due to the tracking deviation by the corresponding amount before the tape feed control system settles, and no problem will arise. The polarity of $\delta$ may be selected so that the value of $V_{n+1}$ approaches zero following the modification. This scheme favorably halves the maximum value of time spent in the zero-approach as compared with the case of a fixed polarity.

This invention enables VTRs without using signals on the control track to reproduce pictures at variable playback speed with extremely little noises on the screen. Particularly, its almost step-less tape speed change allows the full exertion of the features of the moving head supported by the piezo-electric element. The inventive system is immediately applicable not only to the currently prevailing 2-head helical scanning system, but also to various other magnetic tape recording systems including the 4-head system and azimuth recording system, and it is greatly valuable for the industry.

What we claim is:

1. An apparatus for reproducing information signals that have been recorded at adjacent recording tracks disposed at a predetermined track pitch on a magnetic tape, the tape additionally having four kinds of pilot signals that have been recorded sequentially and cyclically over the information signals, said apparatus comprising:

means for moving the tape at a predetermined feed speed, the means for moving including means for measuring tape speed;

pickup means for reading the moving tape to generate a pickup output signal, the tape being wound askew around the pickup means, the pickup means including a cylinder which is provided with at least one rotary magnetic head mounted on an electromechanical transducer;

means responsive to the pickup output signal for generating a video signal corresponding to the recorded information signals;

means responsive to the pickup output signal for generating a tracking error signal produced in relation to a level difference of crosstalk signals of pilot signals on preceding and following adjacent recording tracks of a recording track that is being read; and driving means responsive to the tracking error signal for generating a drive signal to displace the electromechanical transducer during sequential head scannings of the tape, the driving means including waveform generating means for generating a preset voltage waveform having a slope and a center value during each head scanning, the waveform generating means including calculation means for calculating values of $V_{n+1}$, $SL_{n+1}$ and $RE_{n+1}$ for the next head scanning, the calculated values fulfilling the following conditions $$\frac{V_{n+1}}{V_t} = \frac{V_n}{V_t} + \frac{TS_n}{TS_t} - K \left( \text{where } \left| \frac{V_{n+1}}{V_t} \right| \leq \frac{1}{2} \right)$$

$$\frac{SL_{n+1}}{SL_t} = \frac{TS_n}{TS_t} - 1$$

$[RE_n + 1] RE_{n+1} = RE_n + K - 4m$ (where $1 \leq RE_{n+1} \leq 4$)

where $TS_t$ was the magnetic tape feed speed when the information signals and pilot signals were recorded on the tape, $V_t$ is a voltage necessary to displace said electromechanical transducer by one track pitch, $SL_t$ is the slope of the preset voltage waveform necessary to displace said electromechanical transducer by one track pitch during a head scanning, $TS_n$ is the current magnetic tape feed speed, $V_n$ is the center value of the preset voltage waveform for the current head scanning, $RE_n$ is a reference signal for the current head scanning, $V_{n+1}$ is the center value of the preset voltage waveform necessary for the next head scanning, $SL_{n+1}$ is the slope of the preset voltage waveform necessary for the next head scanning, $RE_{n+1}$ is a reference signal for the next head scanning, and K and m are integers.

2. An apparatus according to claim 1, wherein the means for moving the tape comprises means for selectively moving the tape at one of a first tape speed and a second tape speed, and means operative at least once during transitions between the first and second tape speeds for moving the tape at a tape feed speed which is the slower of said first and second tape speeds added by a tape feed speed that is slower than the difference of said first and second tape speeds, or at a tape speed which is the faster of said first and second tape speeds subtracted by a tape feed speed that is slower than the difference of said first and second tape speeds.

3. An apparatus according to claim 1, wherein the means for measuring the tape speed comprises an FG device which generates an FG signal with a frequency proportional to the tape feed speed, and wherein the means for moving the tap additionally comprises a frequency multiplying circuit which multiplies the frequency of the FG signal, means for generating a speed command signal, a variable frequency division circuit which divides the frequency of the output signal of said frequency multiplying circuit with a division rate varying in response to the speed command signal, an f-V conversion circuit which produces a voltage related to the frequency of the output signal of said variable frequency division circuit, and a gain varying circuit provided after said f-V conversion circuit.

4. An apparatus according to claim 1, wherein the calculation means additionally comprises means for testing the value of $V_{n+1}$ at every j turns of the head scanning operation ($j \geq 1$) and, unless $V_{n+1}$ is zero, for replacing the tested value of $V_{n+1}$ with a value $V'_{n+1} = V_{n+1} + \delta$, where $\delta$ is a small value.

5. A magnetic recording-playback apparatus according to claim 4, wherein said $\delta$ in the expression $V'_{n+1} = V_{n+1} + \delta$ has a polarity determined so that the value of $V'_{n+1}$ approaches zero.

6. An apparatus for reproducing information signals that have been recorded at adjacent recording tracks disposed at a predetermined track pitch on a magnetic tape, the tape additionally having four kinds of pilot signals that have been recorded sequentially and cyclically over the information signals, the signals being recorded at an azimuth, said apparatus comprising:

means for moving the tape at a predetermined feed speed, the means for moving including means for measuring the tape speed;

pickup means for reading the moving tape to generate a pickup output signal, the tape being wound askew around the pickup means, the pickup means including a cylinder which is provided with at least one rotary magnetic head mounted on an electromechanical transducer, the at least one magnetic head having an azimuth that may not be consistent with the azimuth of the recorded signals;

means responsive to the pickup output signal for generating a video signal corresponding to the recorded information signals;

means responsive to the pickup output signal for generating a tracking error signal produced in relation to a level difference of crosstalk signals of pilot signals on preceding and following adjacent recording tracks of a recording track that is being read; and driving means responsive to the tracking error signal for generating a drive signal to displace the electromechnical transducer during sequential head scannings of the tape, the driving means including waveform generating means for generating a preset voltage waveform having a slope and a center value during each head scanning, the waveform generating means including determining means for determining whether the azimuth of the at least one magnetic head is consistent with the azimuth of the recorded signals, and calculation means for calculating values of $V_{n+1}$, $SL_{n+1}$, and $RE_{n+1}$ for the next scanning, the calculated values fulfilling the following conditions if the azimuth of the at least one magnetic head is consistent with the azimuth of the recorded signals $$\frac{V_{n+1}}{V_t} = \frac{V_n}{V_t} + \frac{TS_n}{TS_t} - K \left( \text{where } \left| \frac{V_{n+1}}{V_t} \right| \leq \frac{1}{2} \right)$$

$$\frac{SL_{n+1}}{SL_t} = \frac{TS_n}{TS_t} - 1$$

$$RE_{n+1} = RE_n + K - 4m \text{ (where } 1 \leq RE_{n+1} \leq 4)$$

where $TS_t$ was the magnetic tape feed speed when the information signals and pilot signals were recorded on the tape, $V_t$ is a voltage necessary to displace said electromechanical transducer by one track pitch, $SL_t$ is the slope of the preset voltage waveform necessary to displace said electromechanical transducer by one track pitch during a head scanning, $TS_n$ is the current magnetic tape feed speed, $V_n$ is the center value of the preset voltage waveform for the current head scanning, $RE_n$ is a reference signal for the current head scanning, $V_{n+1}$ is the center value of the preset voltage waveform necessary for the next head scanning, $SL_{n+1}$ is the slope of the preset voltage waveform necessary for the next head scanning, $RE_{n+1}$ is a reference signal for the next head scanning, and K and m are integers, wherein the calculation means additionally includes means for calculating values for $V'_{n+1}$ and $RE'_{n+1}$ and for using $V'_{n+1}$ and $RE'_{n+1}$ in lieu of $V_{n+1}$ and $RE_{n+1}$ if the azimuth of the at least one magnetic head is not consistent with the azimuth of the recorded signals, the values $V'_{n+1}$ and $RE'_{n+1}$ being obtained using one of expression sets $$\frac{V'_{n+1}}{V_t} = \frac{V_{n+1}}{V_t} - 1$$

$$RE'_{n+1} = RE_{n+1} + 1 - 4m \text{ (where } 1 \leq RE'_{n+1} \leq 4)$$

$$\frac{V'_{n+1}}{V_t} = \frac{V_{n+1}}{V_t} + 1$$

$$RE'_{n+1} = RE_{n+1} - 1 - 4m \text{ (where } 1 \leq RE'_{n+1} \leq 4).$$

7. An apparatus according to claim 6, wherein the calculation means additionally comprises means for testing the value of $V_{n+1}$ at every j turns of the head scanning operation (j ≧ 1) and, unless $V_{n+1}$ is zero, for replacing the tested value of $V_{n+1}$ with a value $V'_{n+1} = V_{n+1} + \delta$, where $\delta$ is a small value.

8. A magnetic recording-playback apparatus according to claim 7, wherein said $\delta$ in the expression $V'_{n+1} = V_{n+1} + \delta$ has a polarity determined so that the value of $V'_{n+1}$ approaches zero.

9. An apparatus for reproducing information at variable speeds from a magnetic tape wherein information signals are recorded as a group of discontinuous recording tracks on the magnetic tape which is wound askew around a cylinder provided with a rotary magnetic head mounted on an electromechanical transducer, and four pilot signals ($f_1$, $f_2$, $f_3$ and $f_4$) of different frequencies for tracking control are recorded sequentially and cyclically superposed on the information signals, said apparatus comprising:

means responsive to a reference value for generating a reference signal having the same frequency as that of the pilot signal recorded on a track to be played;

means responsive to the reference signal for generating a tracking error signal produced in relation to an amplitude level difference of crosstalk signals of pilot signals reproduced on preceding and following adjacent recording tracks of the recording track to be played in the playback operation;

operating panel means for setting the magnetic tape feed speed $TS_n$ for use in the playback operation;

speed control means, responsive to the tracking error signal and to a speed command signal, for moving the tape at the magnetic tape feed speed $TS_n$ during the playback operation;

arithmetic processing means for determining a ratio of the playback magnetic tape feed speed $TS_n$ to a magnetic tape feed speed $TS_t$ at recording, and for outputting the ratio $TS_n/TS_t$ to the speed control means as the speed command signal, said arithmetic processing means including a memory, said arithmetic processing means calculating, for each head scanning, values of $V_{n+1}$ representing a center value of a sawtooth waveform voltage necessary for the next head scanning, $RE_{n+1}$ representing the reference value for the next head scanning, and $SL_{n+1}$ representing an amount of slope corresponding to an amplitude of the sawtooth waveform voltage for the next scanning, by using $V_t$ representing a voltage necessary to displace said magnetic head by said electromechanical transducer by one track pitch in a width direction of said track, the $V_t$ being stored in said memory, the current magnetic tape feed speed ratio $TS_n/TS_t$, $V_n$ representing a center value of a sawtooth waveform voltage in a head scanning period, $RE_n$ representing the reference value (n = 1, 2, 3 or 4 respectively corresponding to $f_1$, $f_2$, $f_3$ or $f_4$) which is currently used to obtain the tracking error signal, and $SL_t$ representing an amount of slope of a sawtooth waveform voltage necessary to displace said electromechanical transducer by one track pitch during a head scanning, so that the values of $V_{n+1}$, $RE_{n+1}$, and $SL_{n+1}$ satisfy the following conditions $$\frac{V_{n+1}}{V_t} = \frac{V_n}{V_t} + \frac{TS_n}{TS_t} - K, \text{ or } V_{n+1} = V_n + \left( \frac{TS_n}{TS_t} - K \right) V_t$$

$$\frac{SL_{n+1}}{V_t} = \frac{TS_n}{TS_t} - 1, \text{ or } SL_{n+1} = \left( \frac{TS_n}{TS_t} - 1 \right) V_t, \text{ and}$$

$$RE_{n+1} = RE_n + K - 4m$$

where, K and m are integers selected so that the values of $V_{n+1}$ and $RE_{n+1}$ satisfy the conditions $$\left| \frac{V_{n+1}}{V_t} \right| \leq \frac{1}{2}, \text{ and}$$

$$[□1 \leq RE_{n+1} \leq 4, \text{ and}$$

means for generating the sawtooth waveform voltage of the head scanning period for the next head scanning in accordance with $V_{n+1}$ and $SL_{n+1}$ obtained by said arithmetic processing means, the sawtooth waveform voltage thus obtained being applied to said electromechanical transducer to displace the magnetic head.

10. An apparatus for reproducing information at variable speeds from a magnetic tape according to claim 9, wherein the recording is performed by using heads having two different azimuth angles, and adjacent tracks are recorded by the heads of different azimuth angles to each other, and two pairs of said four pilot signals correspond to said two different azimuth angles respectively, and wherein when the azimuth angle of the head to be used for playback is not consistent with the azimuth angle of a signal recorded on a track indentified by the value of $RE_{n+1}$ obtained by said arithmetic processing means, said sawtooth waveform voltage generating means and said reference signal generating means generate said sawtooth waveform voltage and said reference signal respectively by using values $V'_{n+1}$ and $RE'_{n+1}$ which are obtained using one of the expression sets:

$$\frac{V'_{n+1}}{V_t} = \frac{V_{n+1}}{V_t} - 1 \text{ or } V'_{n+1} = V_{n+1} - V_t$$

$$RE'_{n+1} = RE_{n+1} + 1 - 4m' \text{ (where } m' \text{ is an integer to satisfy } 1 \leq RE'_{n+1} \leq 4\text{), and}$$

$$\frac{V'_{n+1}}{V_t} = \frac{V_{n+1}}{V_t} + 1 \text{ or } V'_{n+1} = V_{n+1} + V_t$$

$$RE'_{n+1} = RE_{n+1} - 1 - 4m'' \text{ (where } m'' \text{ is an integer to satisfy } 1 \leq RE'_{n+1} \leq 4\text{)}$$

thereby to obtain the tracking error signal.

11. An apparatus according to claim 10, wherein said arithmetic processing means tests the value of $V_{n+1}$ obtained by the arithmetic process at every j turns of head scanning operations ($j \geq 1$) and, unless $V_{n+1}$ is zero, the value of $V_{n+1}$ is replaced with the value of $V'_{n+1} = V_{n+1} + \delta$, where $\delta$ is a small value.

12. An apparatus according to claim 11, wherein said $\delta$ in the expression $V''_{n+1} = V_{n+1} + \delta$ has a polarity determined so that the value of $V''_{n+1}$ approaches zero.

13. An apparatus according to claim 9, wherein the speed control means comprises means operative at least once, when the operating panel means is employed to change the playback tape speed from a first tape speed to a second tape speed, for exerting tape speed control at a tape feed speed which is the slower of said first and second tape speeds added by a tape feed speed that is slower than the difference of said first and second tape speeds, or at a tape speed which is the faster of said first and second tape speeds subtracted by a tape feed speed that is slower than the difference of said first and second tape speeds.

14. An apparatus according to claim 9, wherein the speed control means comprises an FG device which generates a signal with a frequency proportional to the tape feed speed, a frequency multiplying circuit which multiplies the frequency of the FG signal, a variable frequency division circuit which divides the frequency of the output signal of said frequency multiplying circuit with a division rate varying in response to the speed command, an f-V conversion circuit which produces a voltage related to the frequency of the output signal of said variable frequency division circuit, and a gain varying circuit provided after said f-V conversion circuit.

15. An apparatus according to claim 9, wherein said arithmetic processing means tests the value of $V_{n+1}$ obtained by the arithmetic process at every j turns of head scanning operations ($j \geq 1$) and, unless $V_{n+1}$ is zero, the value of $V_{n+1}$ is replaced with the value of $V'_{n+1} = V_{n+1} + \delta$, where $\delta$ is a small value.

16. An apparatus according to claim 15, wherein said $\delta$ in the expression $V'_{n+1} + \delta$ has a polarity determined so that the value of $V'_{n+1}$ approaches zero.

* * * * *